Oct. 28, 1969   JEAN-PAUL FILIPPI ET AL   3,474,620
REMOTE-CONTROL OPERATED AND PNEUMATIC LOGICAL
RELAYS MONITORED INSTALLATION
Filed June 20, 1967   7 Sheets-Sheet 3

INVENTORS
JEAN-PAUL FILIPPI
MARC EDOUARD ZUCCA
BY
Kenyon & Kenyon
ATTORNEYS

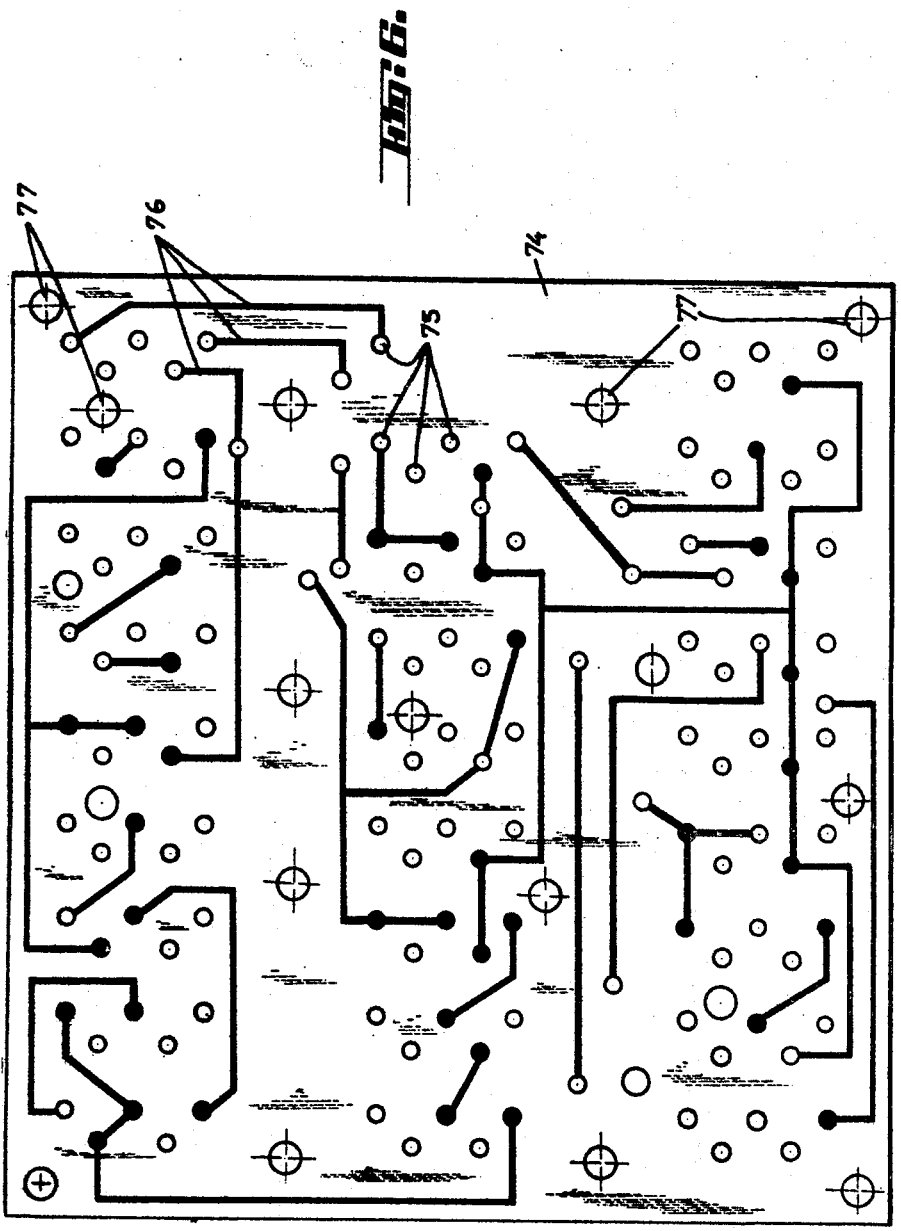

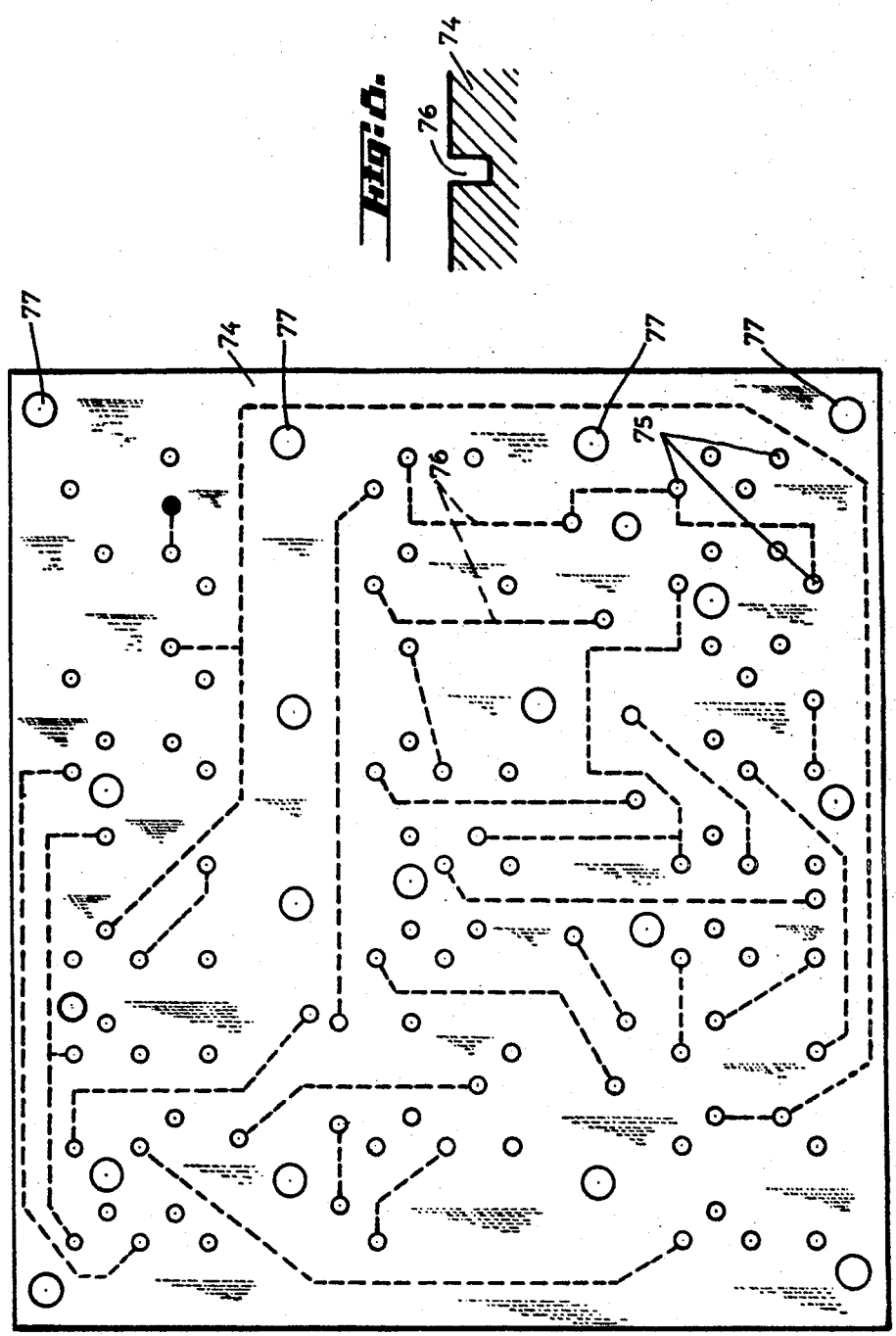

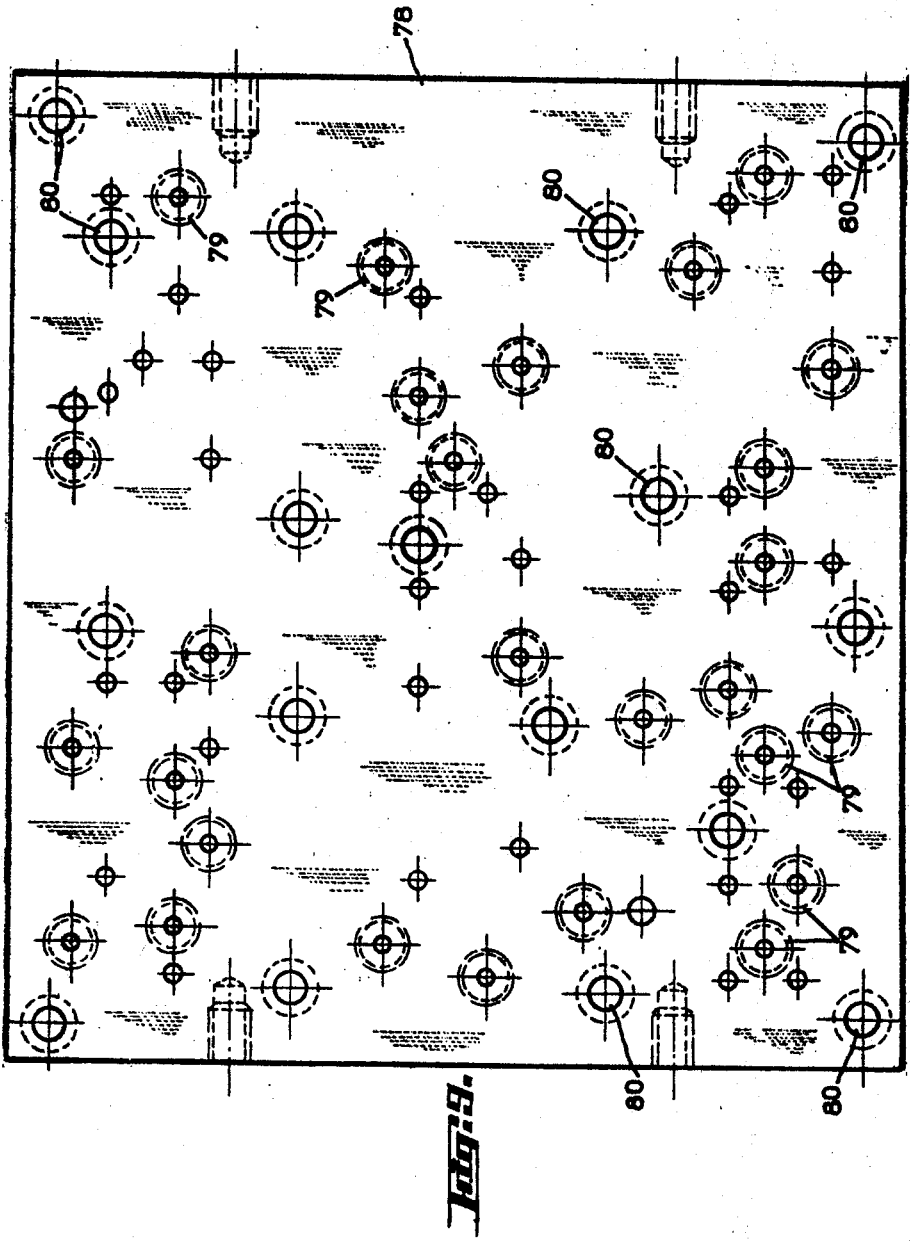

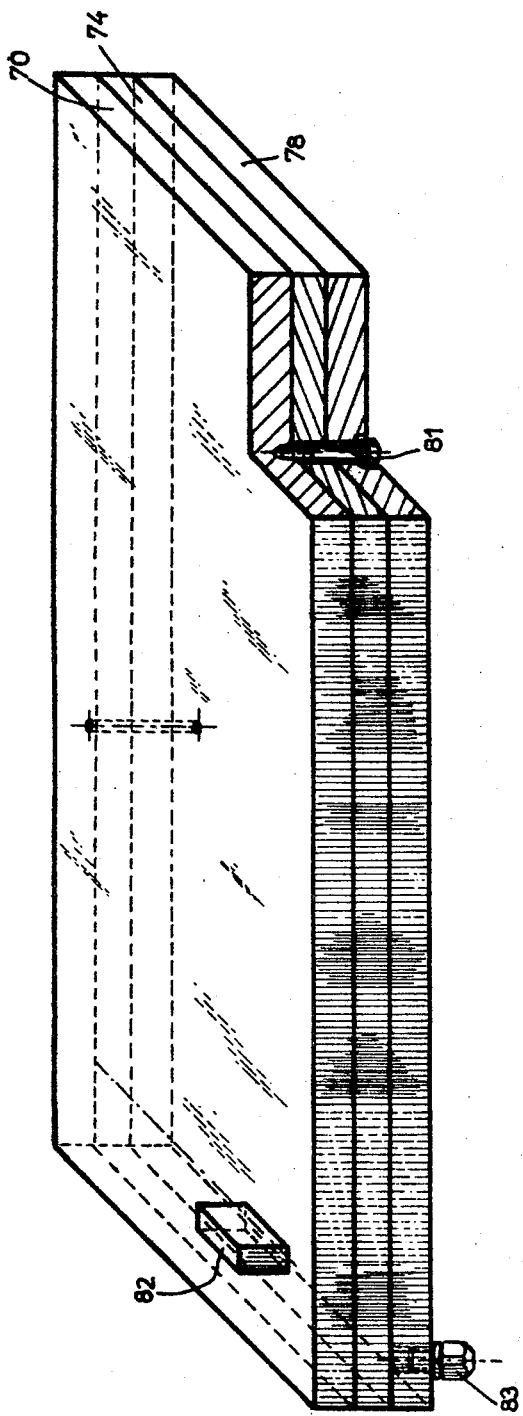

United States Patent Office 3,474,620
Patented Oct. 28, 1969

3,474,620
REMOTE-CONTROL OPERATED AND PNEUMATIC LOGICAL RELAYS MONITORED INSTALLATION
Jean-Paul Filippi and Marc Edouard Zucca, La Ciotat, France, assignors of one-third to Chantiers Navals de la Ciotat, La Ciotat (Bouches-du-Rhone), France, a company of France
Filed June 20, 1967, Ser. No. 647,467
Claims priority, application France, June 23, 1966, 66,706
Int. Cl. F01b 25/00, 25/06; F01d 17/00
U.S. Cl. 60—16                    20 Claims

ABSTRACT OF THE DISCLOSURE

It includes a storage device designed to operate the starting circuit of an air-starting engine, a unit controlling a pre-lubrication valve, another unit controlling a supply ON/OFF valve, said units being operated by said starting circuit, an arrangement controlling a starting-air valve, a time-lag device with rated transit time $t_1$ and monitoring said arrangement and unit, an amplifier operating said time-lag device which opens the starting-air valve and closes the pre-lubrication valve, and said storage device which suppresses the pressure to the starting-air valve and the fluid supply ON/OFF valve.

---

The present invention has essentially for its object a remote-control operated and pneumatic logical relays monitored installation for a manually or automatically attended to thermal driving engine, especially for a compressed-air starting marine diesel engine, of the type comprising an admission valve for the pre-lubrication oil, an ON/OFF fluid fuel delivery valve, an inlet valve for the starting air, as well as a number of security apparatus sensitive to oil pressure, air temperature, rotating speed of the engine, etc., these apparatus being provided to be tripped as soon as one of the aforementioned physical data reaches a rated limit value.

According to a salient feature of the invention, the aforesaid installation is especially remarkable in that it includes essentially a first storage device connected to a starting control circuit and designed to open or to close the starting circuit, two units connected with the starting circuit by means of said storage device, the one controlling the pre-lubrication valve while the other operates the fluid supply ON/OFF valve, these two units, upon reception of a starting trigger pulse, respectively opening said pre-lubrication valve and setting said ON/OFF valve under pressure, an arrangement controlling said starting-air valve, a time-lag device with a rated transit time $t_1$ and monitoring both said arrangement controlling the starting-air valve and said unit controlling the pre-lubrication valve, an amplifier equipment also connected to the starting circuit by means of the aforesaid storage device and acting, when it receives a starting trigger pulse, on the one hand, upon said time-lag device which, at the end of a time $t_1$, opens the starting-air valve and closes the pre-lubrication valve, and, on the other hand, upon said storage device which, at the end of a time $t_2 > t_1$, closes the starting circuit and consequently suppresses the pressure applied to both the starting-air valve and the fluid supply ON/OFF valve, while the aforesaid security apparatus are provided, when locked, to close the starting-air valve and to apply a safety pressure to said fluid supply ON/OFF valve in order to keep the engine running after the end of the starting stage.

The installation according to the invention is based upon a sequential connection lay-out utilizing exclusively pneumatic logical relays. Compared with electrical relays, the logical relays of this type present a number of advantages. Their operation involves no danger, even in explosive or inflammable atmosphers; their maintenance being much easier, they are much more economical; and finally, they maintain practically constant characteristics over a long range of time.

Besides, by using in the installation according to the invention relays capable of operating practically instantaneously, even when employed for time-delaying purposes, a perfect automation may be achieved.

According to another salient feature of the invention, the aforementioned storage device comprises a first relay, supplied by said starting control circuit through change-over relays, as well as a second relay controlling the stoppage of said first relay and supplied by the aforesaid amplifier equipment through a power governor and a capacity.

According to still another feature of the invention, the unit controlling the pre-lubrication valve is constituted by a relay, supplied by said starting control circuit through the first relay of the aforementioned storage device and controlled by said time-lag device, this relay delivering an operating pressure onto a distributor connected with said pre-lubrication valve.

According to another salient feature of the invention, the unit controlling said fluid supply ON/OFF valve comprises a first relay which is operated by said first relay of the aforesaid storage device, and a second relay which is introduced within the load circuit of said first relay and delivers an operating pressure onto a distributor connected with the fluid supply ON/OFF valve.

According to still another feature of the invention, the arrangement controlling said starting-air valve comprises a first relay, supplied by said starting control circuit through said first relay of the storage device and operated by said time-lag device, as well as a second relay, introduced within the load circuit of this first relay and delivering an operating pressure to a distributor connected with said starting-air valve.

According to still another feature of the invention, the time-lag device is made up by a relay controlled by the amplifier equipment and delivering an exciting pressure unto both the pre-lubrication relay and the first relay of the arrangement controlling the starting air.

According to still another feature of the invention, the aforesaid amplifier equipment is constituted by a relay operated by the first relay of said storage device and supplying the second relay of this storage device while delivering an operating pressure unto the time-lag device.

Still according to the invention, the installation includes a controlling device for the manual stopping of the engine, designed to suppress the pressure applied on the fluid supply ON/OFF valve and to close the starting control circuit.

In addition, at least one system, allowing the eventual production of at least one additional engine-starting sequence is also provided for the case where the engine does not start at the end of the first sequence.

The installation according to the invention is besides provided with a "priority to first-in-time data" relay, designed to detain the tripping of a non-starting alarm system until the end of the additional starting sequence or sequences.

Many other features and advantages of the invention will appear more clearly from the following description, made wtih reference to the appended drawings given only by way of example and wherein:

FIGURE 1a represents diagrammaticaly a pneumatic logical relay of the type used in the installation of FIGURE 1;

FIGURE 6 is a view from above of the plate into which the supply ducts are engraved according to the invention;

FIGURE 7 is a view from below of the engraved plate shown on FIGURE 6;

FIGURE 8 is a partial cross-section through said engraved plate, showing a fluid channel in cross-section;

FIGURE 9 represents a connecting plate according to the invention;

FIGURE 10 represents, in a perspective and with a partial breaking away, a fastening base according to the invention and desgined to receive the pneumatic relays.

Figure 1:
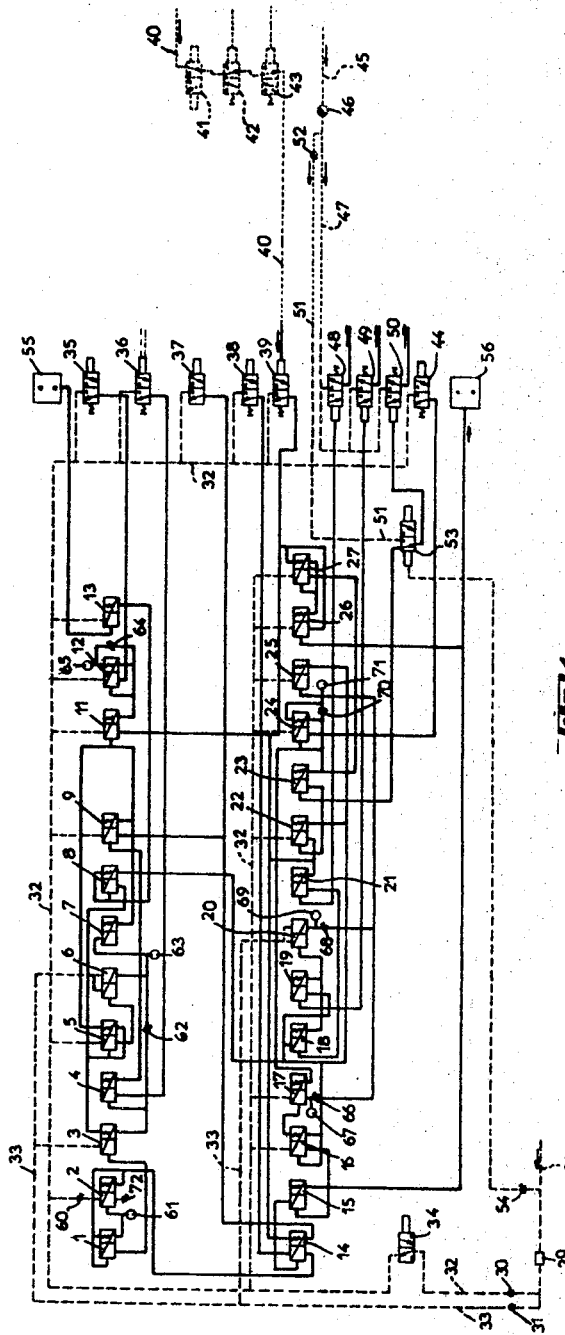
FIGURE 1 represents the overall schematic diagram of a remote-controlling and monitoring installation according to the invention, utilized with a marine diesel engine.
Figure 2:
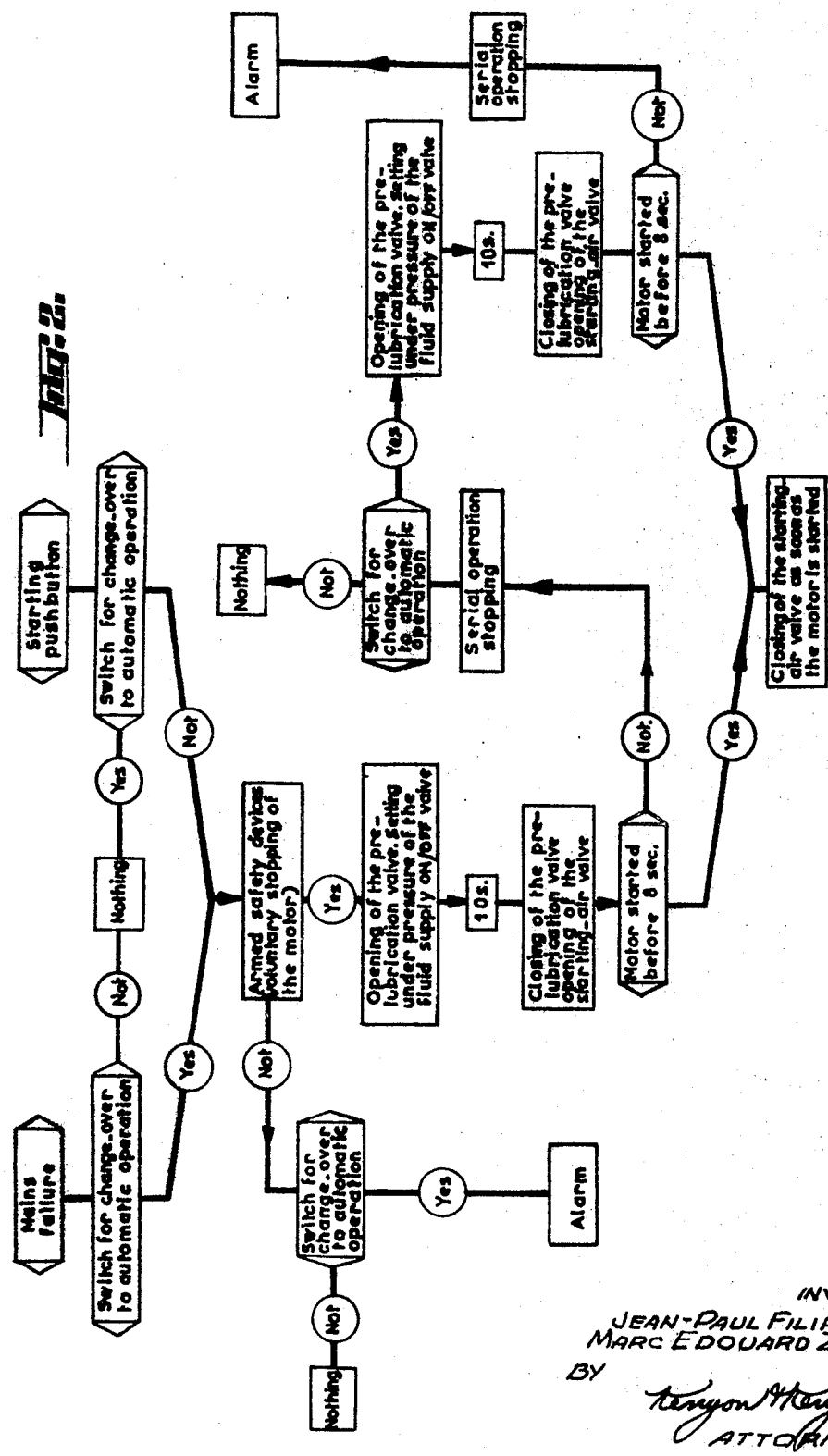
FIGURE 2 represents the logical program of the engine-starting sequence.

According to the method of embodiment represented on FIGURE 1, the installation of the invention comprises, when applied to the remote-control and to the monitoring of a marine diesel engine, twenty-six pneumatic logical relays, indicated by reference numbers 1 to 9 and 11 to 27.

These relays, which are all based upon one and the same principle of action, comprise each, as shown by the skeleton diagram of FIGURE 1a, two distinct casings S and T which constitute respectively a three-channels valve and the control unit of this valve, both casings being separated by a fluid-tight partition U upon which a tiltable blade V is hingedly fastened. The casing T itself is divided into two distinct chambers: a first chamber T1, called excitation chamber, and a second chamber T2, the separation between chambers T1 and T2 being achieved by means of a resilient diaphragm W. A spring X, housed within chamber T2, keeps normally the tilting blade V in the position represented on FIGURE 1a.

The chambers T1 and T2 are provided with apertures respectively indicated as a and b, while the casing S, which constitutes a three-channels valve, is provided with a first orifice c, called load orifice, and with two ports d and e which co-operate with the blade V and which are liable to be alternately closed by said blade, according to its position.

The operation of these pneumatic logical relays is known and requires no additional explanation. All of the relays 1 to 27 of FIGURE 1 are in accordance with the skeleton diagram represented on FIGURE 1a, so that, in order to allow the clearest possible reading of FIGURE 1, the different reference numbers of FIGURE 1a are not repeated, and it will be sufficient to go back to FIGURE 1a to understand the principle of connection in anyone of said relays 1 to 27.

A mains supply network 28, delivering a fluid under pressure, for instance compressed air under a pressure of 7 bars, feeds to control circuits 32 and 33 through the medium of a filter 29 and of two pressure-reducers 30 and 31. The control circuits 32 and 33 operate under different pressures: the circuit 32 under a presure P1, for instance of a 1.4 bar value, and the circuit 33 under a distinctly lower pressure P2, for example with a value of 0.8 bar. The circuits 32 and 33, the first through a micro-valve 34 allowing to put it in or out of service, supply the different relays of the installation.

The circuit 32 supplies besides a push-button micro-valve 35 designed to re-arm the automatic control, an electric slide-valve 36 operated by a (not represented) detecting device of any type, for instance a mains failure detector if the engine energizes a generator of electric current, said slide valve being itself capable of supplying the distribution network in case of a failure in the main installation, a micro-valve 37 securing the starting of the automatic control, this micro-valve allowing to switch over the installation from automatic control to manual control and inversely, a push-button micro-valve 38 allowing a manually controlled starting, a distributor 39 and finally a push-button micro-valve 44 which controls the stopping of the engine and secures the re-arming of the security elements.

The distributor 39 is connected with a circuit of fluid under pressure 40, for instance a circuit of air under a pressure of 7 bars, through the medium of three series-connected security elements: an engine overspeed security element 41, an oil pressure control set 42 and a water temperature control set 43.

The starting air of the engine arrives under a relatively high pressure, for instance 25 bars, by a conduit 45 which is connected, through the medium of a pressure-reducing valve 46 which brings down this initial pressure of 25 bars to a pressure of for instance 7 bars, with a pipe 47, itself connected to a distributor 48 controlling the starting-air valve, to a distributor 49 controlling the pre-lubrication valve and to a distributor 50 which sets under pressure the fluid supply ON/OFF valve of the engine.

A channel 51, connected to the pipe 47 through the medium of a pressure-reducing valve 52 which brings the 7 bars pressure down to the pressure value (i.e. 1.4 bar) of the supply circuit 32, is also connected to a distributor 53 which itself is connected to the mains supply network 28 through the medium of a power governor 54.

The installation comprises besides two manometrical switches 55 and 56, the first controlling a non-starting alarm system, the second designed to indicate the disarming of the securities.

A certain number of power governors and of capacities are inserted within the circuit of some relays in order to introduce a rated time interval between the moment a pulse is sent to the relay and the moment the relay actually tilts. Thus, to the relays 1 and 2, which constitute a square-wave generator, as will be further explained hereafter, are associated two power governors or constrictions 60 and 72 as well as capacity 61; the relay 4, controlling the excitation of relays 3 and 6, includes in its load circuit a governor 62 and a capacity 63; the relay 12 is provided with a constriction 64 and with a capacity 65; the relay 17 is equipped with a governor 66 and a capacity 67 designed to confer to it an eighteen seconds long exciting time; the relay 20 includes a governor 68 and a capacity 69 designed to bring about in said relay a time-lag of ten seconds; finally, the relay 24 comprises a governor 70 and a capacity 71 intended to determine an exciting time of ten seconds.

The installation, by means of the distributors 49, 50 and 48, allows to control respectively the admission valve for the pre-lubrication oil, the ON/OFF fluid delivery valve and the starting-air inlet valve. This control may be achieved after a previous coming into action of the micro-valve 44, for instance in order to bring about the stopping of the engine. The sequential control of all these valves causes normally the engine to run, said running being easily detected by the showing up of an oil pressure within the lubrication circuit.

Figure 3:
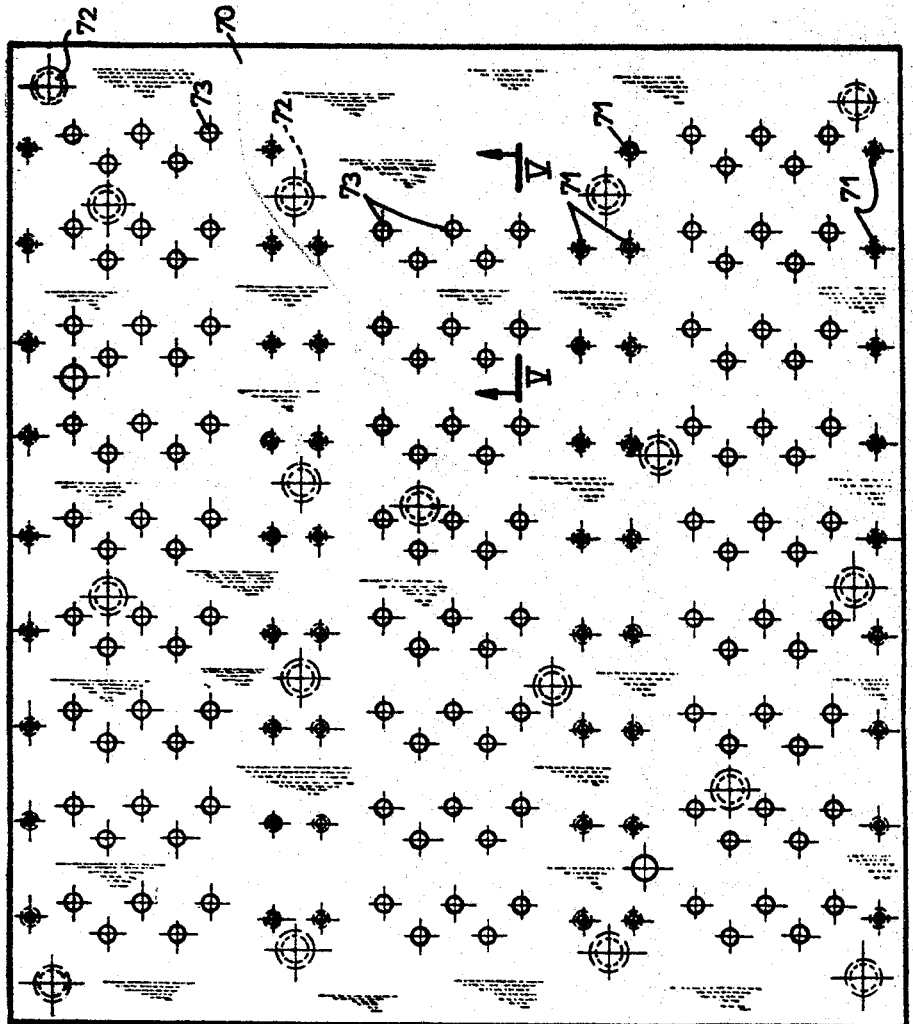
FIGURE 3 shows a relay plate according to the invention, the relays normally arranged upon said plate being supposed removed.

The starting sequence of the engine, as illustrated by the logical program of FIGURE 3, presents following stages:

setting under pressure of the fluid supply ON/OFF valve and simultaneous opening of the pre-lubrication valve;

ten seconds later, closing of the pre-lubrication valve and simultaneous opening of the starting-air valve;

eight seconds later, closing of the starting-air valve and simultaneous connection with the atmosphere of said fluid supply ON/OFF valve;

if the engine starts before the end of the aforementioned period of eight seconds, immediate closing of the starting-air valve with a maintaining under pressure of said fluid-supply ON/OFF valve.

This sequence, which corresponds to the normal starting of the engine, is initiated by acting upon the push-button of micro-valve 38, which closes the supply circuit 32 and emits a starting control pulse toward a relay of the installation, as will be later explained, on condition that the micro-valve 37 controlling the "manual-automatic" change-over be in the position "manual."

The stop control push-button of micro-valve 44 allows, either to stop the engine, or to interrupt the starting sequence under way, whatever the reached stage might be.

If one of the security elements 41, 42 or 43 comes into action while the engine is running and consequently brings on the stopping of the latter, it is not possible to initiate another starting sequence without previously pressing the push-button of micro-valve 44.

When the micro-valve 37 is in its "automatic" position, no result may be obtained by an action upon the starting control push-button of the micro-valve 38. In this case, the engine may only be started if, for instance, a tension failure has occurred.

If this tension failure happens, a first starting sequence is initiated. The engine may of course start with this very first sequence as in the case of a hand-driven starting. But if the engine does not start with the first sequence, a second sequence is iniated. If no result is obtained with this second sequence, an alarm is given by a non-starting alarm system controlled by the manometrical switch 55, and the engine ceases to be excited. As soon as the motor has started, the number of the available attempts for a subsequent excitation is again of two.

The non-starting alarm may be cancelled by actuating the push-button of the micro-valve 35 in order to bring about two new starting sequences. Quite obviously, it is also possible to provide starting sequences in any number more than two.

In the case where starting air is available but no supply air can be obtained under the sequence pressure of 7 bars, it is possible to set the fuel supply ON/OFF valve under pressure by means of the push-button distributor 53. The starting air should then be admitted manually and the stopping of the engine is obtained by tilting back the push-button of the distributor. However, if the air under a proper pressure to supply the sequence becomes again available while the engine is running, the push-button returns automatically to its initial position and the securities 41 to 43, which were cut off, are anew ready to operate. In this case, the engine maintains its normal running. If the push-button is tilted back in the absence of any security pressure, the motor stops.

The installation operates in the following manner.

MANUAL STARTING

By pressing upon the push-button of the micro-valve 38, a starting pulse is delivered toward the inlet port $d$ of relay 14. This pulse proceeds towards relay 15 only if relay 14 is in an excited state, i.e. if the micro-valve 37 used to set the installation under automatic control is in its "manual" position. If the relay 15 is itself in excited state, or better if the micro-valve 44 has already reacted (in a way hereafter explained), the starting pulse is delivered to the port $e$ of relay 16. The latter, memory-arrayed, is self-supplying and delivers a pressure which acts especially upon:

The aperture $a$ of relay 8, the role of which is explained hereafter;

The orifice $e$ of relay 19 which, being at rest, allows the pressure to pass toward the pre-lubrication valve;

The aperture $a$ of relay 22 which transmits the pressure unto the fluid supply ON/OFF valve through the medium of the relay 23;

The aperture $e$ of relay 25 which, arrayed as an amplifier, delivers a pulse, on the one hand, to the time-lag relay 20, the timing of which is set at ten seconds and, on the other hand, through the medium of relay 17, to the memory relay 16 which it cuts out after a time interval of eighteen seconds.

The timing relay 20 having thus changed its state at the end of a ten seconds interval, causes then the relay 18 to tilt and the latter, through the medium of relay 21, sets under pressure the starting-air valve, while the relay 19, also tilted by the relay 20, stops the pre-lubrication.

At the end of the eighteen seconds corresponding to the timing of memory 16, no more pressure is applied, neither on the fluid supply ON/OFF valve, nor upon the starting-air valve. It may readily be seen that the starting air is delivered during eighteen-ten seconds.

If the motor starts before these eighteen seconds are over, the security elements deliver a pressure to the following spots:

The aperture $b$ of the memory relay 27 which comes to rest, as explained hereafter;

The port $e$ of relay 26 in order to replace the pressure delivered by the (just released) relay 27 and to maintain the relay 15 in an excited state;

The port $e$ of relay 11, the role of which will be explained herebelow;

The aperture $a$ of relay 21 which interrupts at once the starting-air admission;

The port $e$ of relay 22 in order to maintain, after the release of relay 16 at the end of eighteen seconds, the fluid supply ON/OFF valve under pressure and consequently to keep the engine under supply; the eventual fading out of the safety pressure would then cause the engine to stop;

The aperture $b$ of relay 14 in such a way, that any further actuation of the push-button operating the micro-valve 38 becomes inefficient when the engine is running.

STOPPING OF THE ENGINE

By pressing the push-button of the micro-valve 44, the delivered short pulse is transformed by the memory 24 relaying said micro-valve into a longer excitation of about ten seconds. Two results are thus obtained:

By its action upon the relay 23, the pulse eliminates the pressure applied to the fluid supply ON/OFF valve. This rated timing of ten seconds is necessary for a sufficient slowing-down of the engine to make the oil pressure (and hence the safety pressure) disappear. This performance corresponds to the normal manner of action for the stopping of the engine;

By acting upon the relay 17, the pulse diverts the eighteen seconds timing and releases eventually the relay 16. Thus, by pressing the push-button of the micro-valve 44, it is not only possible to stop the enigne, but also to interrupt the sequence under way, whatever the reached stage might be.

Moreover, the excitation delivered by the memory 24 arms the memory 27 and allows hence the excitation of relay 15 by an energizing of relay 26. The sequence may consequently be initiated by the starting pulse only if the engine has been stopped by an action upon the micro-valve 44.

If, on the contrary, the stopping of the engine results from the operation of a security, a new sequence becomes possible only if the cause of the corresponding alarm has been removed, said alarm being made visible upon the indicator of the armed securities by an action upon the push-button of the micro-valve 44.

AUTOMATIC OPERATION CONTROLLED BY THE ENGINE ITSELF

In the case where the engine drives a generator of electric current, the tension failure in an installation normally supplied by another generator may advantageously be utilized for the automatic control of this engine, which is designed to operate in case of emergency and which is at arrest when the tension failure occurs. Under these circumstances, the control voltage is applied to the electric slide-valve 36. The tension failure is efficient only if the relay 4 is not in an excited state, i.e. if following conditions are met:

No pressure at the port $e$ of the relay 9, this meaning that the micro-valve 37 must be in its "automatic" position;

No pressure at the aperture *a* of the relay 8, consequently no pressure at the port *e* of the relay 11, this meaning that no security pressure is applied (and that the engine is stopped);

A number of other circumstances which are explained hereafter.

The tension failure leads, through the medium of relay 4, to two main results:

It excites the relay 3, supplying thus the square-wave generator constituted by the relays 1 and 2. This square-wave generator is adjusted in such a way as to emit two pulses, the second occurring only at the end of a time interval which lasts longer than the eighteen seconds of the first sequence. This time interval may for instance be of twenty-five seconds. If the engine starts with the first sequence, the security pressure excites the relay 4, releasing thus the relay 3 and stopping the square-wave generator;

It excites the timer 6 which, thirty-five seconds later, i.e. during the second starting sequence, arms the memory 5. The latter releases the relay 3 and interrupts thus the square-wave generator which allows hence the performance of but two sequences;

The memory 5 delivers its pressure towards the port *e* of the relay 8.

It should be noted that the relay 8 operates in a special way. Indeed, the memory 5 comes into action during the sequence, i.e. at a moment when the engine has still a chance to start, and it is hence necessary that the non-starting alarm does not come into action before the end of this second sequence. But the pressure of the sequence acts upon the aperature *a* of the relay 8.

This relay being thus excited during this sequence, the pressure of the memory 5 cannot excite through it the amplifier relay 13, and consequently cannot actuate the non-starting alarm. On the contrary, as soon as the relay 8 comes back to a rest at the end of the sequence, its aperture *b* is under pressure and the eventual showing up of the pressure of a new sequence cannot make it tilt again. Otherwise expressed, that means that of the two pressures acting in *e* and in *a*, only the first arriving has a determining action, either the one that excites the relay or the other which keeps it at rest. Such a relay is called a "relay giving priority to first-in-time data."

When the engine has started, the installation should allow two new starting sequencies initiated by a subsequent actuation. For this, the starting of the motor should empty the capacity 63. This may also be performed by acting upon the push-button of the micro-valve 35 which re-arms the automatic control and which is relayed by the memory 12.

In both cases, the orifice *c* of relay 11 is under pressure. This results in:

Releasing the memory 5, emptying the capacity 63 by excitation of the relay 7, and releasing thus the relay 6;

Exciting the relay 9 which has the same effect as the "manual" data-presentation to the "automatic-manual" change-over switch, i.e. that the relay 4 is excited and hence that no results may be obtained from the tension failure. This should allow to avoid, at least during the time needed for re-arming, that the capacity 63 be either filled up again or drained off.

The high number of the relays composing the installation leads obviously to an even higher number of connections, which would become difficult to achieve and to control if these relays were interconnected by means of tubes for instance of tubes made of a plastic material.

In order to avoid these difficulties, these connections are achieved by means of a fastening base or the like which supports the relays and comprises incorporated circuits constituted by channels grooved or engraved into at least one rigid plate or the like. This fastening base is hence similar to the printed circuits used in electronics. It is quite obvious that the channels thus constituted must be independent from each other, this meaning that they should not cross each other and that two channels intended to communicate with each other are to be connected, either by a junction tube, or by a hole passing through the plate, when said plate presents a network of channels on both of its faces.

Such a fastening base is preferably obtained by a piling-up of plates, each of the latter playing a determined part. According to the method of embodiment represented on FIGURES 3 to 10, a fastening base according to the invention is constituted by three super-imposed plates: a plate upon which the relays are arrayed and which is called "relay plate," a plate bearing the different connecting channels and called "logical plate," and finally, a plate allowing to connect the installation with the different pressure sources and called "connecting plate."

FIGURE 3 shows a relay plate 70 provided with screw-threaded recessed holes 71 for the fastening of the relays, with screw-threaded recessed holes 72 allowing to fasten it to the other plates, and with communicating orifices 73 opening upon both faces of the plate.

Figure 4:
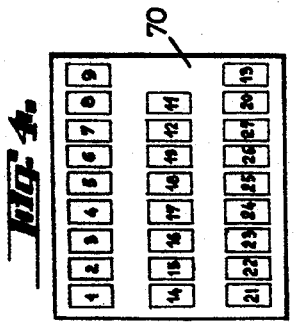
FIGURE 4 illustrates the laying-out of the relays upon said relay plate.
Figure 5:
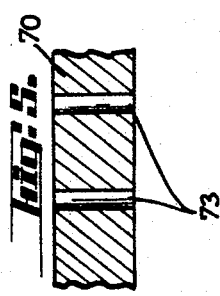
FIGURE 5 is a partial cross-section, along lines V—V of FIGURE 3.

The FIGURE 4 shows a preferred arrangement of the relays upon the plate 70. The FIGURE 5 presents the orifices 73 which are bored through the plate.

In FIGURES 6 and 7 has been represented a logical plate 74 provided with orifices 75 which are connected by channels or the like 76 engraved into the mass of the plate in such a way as to achieve the connection network of the relays. These channels 76 may preferably present a square cross-section, as represented on FIGURE 8. Orifices 77, giving a passage to screws or the like designed to render the logical plate solid with the other plates, are also provided.

FIGURE 9 represents a connecting plate 78 provided with tapped holes 79 designed for the junction pieces which achieve the connection of the relays with the air and data supplying sources and with the devices they control. The orifices 80 are used to fasten the connecting plate to the logical plate and to the relay plate.

In order to constitute a fastening base, these three plates are assembled (see FIGURE 10) by means of screws such as 81, or by bolts; the logical plate 74 is inserted between the relay plate 70 upon which the relays (only one is represented in 82) are laid out, and the connecting plate 78. Fluid-tight packings may be provided between the neighbouring plates in order to avoid any leakage. Such fluid-tight packings may be suppressed if the surfaces of the plates present a state of perfect evenness securing a total fluid-tightness by a mere pressing together. The feeding of the different fluids into the fastening base is secured by connecting pieces such as 83, screwed into the tapped holes 79 of the connecting plate.

The three plates 70, 74 and 78 may be made of any material, for example of a plastic material or again of a metal such as brass, aluminum, etc. Besides, the plates constituting the fastening base may be made of the same or of not the same material.

The channels and orifices of the plates may be obtained either by a mechanical way such as boring, milling, etc., or by moulding, or again by any other process.

Finally, instead of a single fastening base for the whole set of relays, it is possible to utilize several bases upon which a certain number of relays are fastened in order to obtain sub-units which are juxtaposable or not.

Many modifications could be introduced into the method of embodiment represented without leaving by that the scope of the invention. Thus, for instance, the supply of the relays could be achieved under pressures P1 and P2 of any value, on condition that P1 is selected higher than P2. It is also possible to utilize relays of any type, especially relays the moving element of which is constituted, instead of a tilting blade, by another type of moving element, for instance by a ball. Instead of compressed air, these relays could also be controlled by a gas or a liquid under pressure. The timings could be selected with values different from that indicated, of course as long as the successive stages of the operations are respected. It is also possible to provide more than two starting sequences.

What we claim is:

1. In a remote-control operated and pneumatic logical relays monitored installation for a manually or automatically attended to thermal driving engine, especially for a compressed-air starting marine diesel engine having a starting circuit of the type comprising an admission valve for the pre-lubrication oil, an ON/OFF fluid fuel supply valve, an inlet valve for the starting air, as well as a number of security apparatus sensitive to oil pressure, air temperature, rotating speed of the engine, the device which comprises in combination a starting control circuit, a first control circuit under a pressure $P_1$, a second control circuit under a pressure $P_2<P_1$, a storage device connected with said starting control circuit and a unit controlling said pre-lubrication valve, another unit controlling said fluid supply ON/OFF valve, the two latter units, respectively opening said pre-lubrication valve and setting said ON/OFF valve under pressure when receiving a trigger pulse from said starting circuit to which they are both connected by means of said storage device, an arrangement controlling said starting air valve, a time-lag device with a rated transit time $t_1$ and monitoring both said arrangement controlling the starting-air valve and said unit controlling the pre-lubrication valve, an amplifier equipment operating, upon receiving a trigger pulse from said starting circuit to which it is also connected by means of the aforementioned storage device, on the one hand, said time-lag device which, at the end of a time $t_1$, opens said starting air valve and closes said pre-lubrication valve, and, on the other hand, said storage device which, at the end of a time $t_2>t_1$, closes said starting circuit and consequently suppresses the pressure applied to both the starting-air valve and the fluid supply ON/OFF valve while said security apparatus, when locked, are provided to close said starting-air valve and to apply a safety pressure to said fluid supply ON/OFF valve, so as to keep said engine running once the starting stage is over.

2. Device according to claim 1, wherein the aforesaid storage device comprises a first relay, supplied by said starting control circuit, as well as a second relay, having a power governor and a capacity, said second relay controlling the stoppage of said first relay and being supplied by the aforementioned amplifier equipment through said power governor and said capacity.

3. Device according to claim 2, wherein the aforesaid unit controlling said pre-lubrication valve is constituted by one relay, supplied by said starting control circuit through said first relay of the aforementioned storage device and controlled by said time-lag device, said one relay delivering an operating pressure onto said unit controlling said pre-lubrication valve.

4. Device according to claim 2, wherein the aforesaid unit controlling said fluid supply ON/OFF valve comprises a first relay having a load circuit and operated by said first relay of the aforementioned storage device, and a second relay introduced within said load circuit of said first relay and delivering an operating pressure onto the aforesaid unit controlling said fluid supply ON/OFF valve.

5. Device according to claim 2, wherein the aforesaid arrangement controlling said starting-air valve comprises a first relay, having a load circuit supplied by said starting control circuit through said first relay of the aforementioned storage device and operated by said time-lag device, as well as a second relay introduced within said load circuit of said first relay and delivering an operating pressure onto the aforesaid arrangement for controlling said starting-air valve.

6. Device according to claim 1, wherein the aforementioned time-lag device comprises a relay controlled by the aforesaid amplifier equipment and delivering an exciting pressure onto both said pre-lubrication unit and the first relay of said arrangement controlling the starting air.

7. Device according to claim 2, wherein the aforementioned amplifier equipment comprises a relay operated by the first relay of the aforesaid storage device, said relay supplying the second relay of said storage device and delivering an operating pressure onto the aforementioned time-lag device.

8. Device according to claim 1, further comprising a controlling device for the manual stopping of said engine, designed to suppress the pressure applied upon said fluid supply ON/OFF valve and to disconnect said starting control circuit.

9. Device according to claim 8, wherein the aforementioned controlling device for the stopping of the engine comprises a memory relay supply an excitation pressure to said ON/OFF valve controlling unit and to said storage device.

10. Device according to claim 1, wherein a system, allowing the eventual production of additional engine starting sequences, is also provided for the case where the engine does not start at the end of the starting sequence.

11. Device according to claim 10, wherein said system comprises a square-wave generator, set so as to deliver at least two successive pulses with a time interval which is longer than the control time of the aforementioned storage device, in such a way as to bring about a second starting sequence in case the engine does not start at the end of the first sequence.

12. Device according to claim 11, further comprising a time-lag relay and a memory relay for the stopping of the aforementioned square-wave generator so as to allow the production of but two consecutive starting sequences.

13. Device according to claim 12, further comprising a non-starting alarm system and a so-called "relay with priority to first-in-time data" to detain the tripping of said non-starting alarm system until the end of the additional starting sequence or sequences.

14. Device according to claim 13, wherein said "relay with priority to first-in-time data" is operated by said starting control circuit through the aforementioned first storage device, is supplied by said memory relay which stops the supply relay of said square-wave generator, and it supplies non-starting alarm system, through an amplifier relay, said "relay with priority to first-in-time data" being in an excited state during the starting sequence and coming to a rest at the end of said sequence, so that the occurrence of a new strating sequence cannot bring on its tilting over.

15. A device according to claim 1, further comprising at least two change-over relays connected in series between said control starting circuit and said storage device.

16. Device according to claim 1, wherein said storage device, said units, said arrangement, said time-lag device, and said amplifier equipment are supported on a fastening base provided with incorporated fluid supply ducts.

17. Device according to claim 16, wherein said base comprises a pile of fastening plates, each of which is provided with orifices and ducts for the passage of various fluids.

18. Device according to claim 16, wherein said base includes a first plate into which said fluid supply ducts are engraved, a second plate bearing said storage device, said units, said arrangement, said time-lag device and said amplifier equipment and a third plate connected to said starting control circuit and said control circuits under pressures $P_1$ and $P_2$, said first plate being inserted between said second and said third plates.

19. Device according to claim 18 wherein the aforementioned plates are made of a plastic material.

20. Device according to claim 18 wherein the aforementioned plates are made of metal.

(References on following page)

References Cited

UNITED STATES PATENTS

| | | | |
|---|---|---|---|
| 2,551,429 | 5/1951 | Eppens | 137—28 X |
| 2,894,521 | 7/1959 | Carleton | 137—17 |
| 3,189,047 | 6/1965 | Puster | 137—26 X |
| 3,216,436 | 11/1965 | Johnson | 137—28 |
| 3,291,146 | 12/1966 | Walker | 137—17 |
| 3,291,147 | 12/1966 | Walker | 137—17 |
| 3,301,269 | 1/1967 | Marwood | 137—26 X |

CLARENCE R. GORDON, Primary Examiner

U.S. Cl. X.R.

415—19

PO-1050
(5/69)

UNITED STATES PATENT OFFICE
CERTIFICATE OF CORRECTION

Patent No. 3,474,620     Dated October 28, 1969

Inventor(s) Jean-Paul Filippi and Marc Edouard Zucca

It is certified that error appears in the above-identified patent and that said Letters Patent are hereby corrected as shown below:

Column 2, line 2 "atmosphere" should read --atmospheres--

Column 2, line 64 "wtih" should read ---with---

Column 3, line 20, "desgined" should read --designed---

Column 5, line 68 "$\underline{e}$" should read ---$\underline{a}$---

Column 7, line 44, "sequencies" should read --sequences--

Column 10, line 14, "supply" should read --supplying---

Column 10, line 43, after "supplies" insert ---said---

Column 10, line 47, "strating" should read --starting---

SIGNED AND
SEALED
JUN 16 1970

(SEAL)
Attest:

Edward M. Fletcher, Jr.
Attesting Officer

WILLIAM E. SCHUYLER, JR.
Commissioner of Patents